US010379897B2

(12) United States Patent
Philipp

(10) Patent No.: US 10,379,897 B2
(45) Date of Patent: Aug. 13, 2019

(54) ADAPTIVE JOB SCHEDULING UTILIZING PACKAGING AND THREADS

(71) Applicant: SuccessFactors, Inc., South San Francisco, CA (US)

(72) Inventor: Ralf Philipp, Altlußheim (DE)

(73) Assignee: SuccessFactors, Inc., South San Francisco, CA (US)

(*) Notice: Subject to any disclaimer, the term of this patent is extended or adjusted under 35 U.S.C. 154(b) by 911 days.

(21) Appl. No.: 14/967,794

(22) Filed: Dec. 14, 2015

(65) Prior Publication Data

US 2017/0169371 A1 Jun. 15, 2017

(51) Int. Cl.
G06F 9/48 (2006.01)
G06F 9/50 (2006.01)
G06Q 10/06 (2012.01)
G06F 16/28 (2019.01)

(52) U.S. Cl.
CPC ............. *G06F 9/48* (2013.01); *G06F 9/4806* (2013.01); *G06F 9/4843* (2013.01); *G06F 9/4881* (2013.01); *G06F 9/50* (2013.01); *G06F 9/5005* (2013.01); *G06F 9/5027* (2013.01); *G06F 9/5038* (2013.01); *G06F 16/285* (2019.01); *G06Q 10/06311* (2013.01)

(58) Field of Classification Search
CPC ........ G06F 9/48; G06F 9/4806; G06F 9/4843; G06F 9/4881; G06F 9/50; G06F 9/5005; G06F 9/5027; G06F 9/5038
See application file for complete search history.

(56) References Cited

U.S. PATENT DOCUMENTS

| | | | | |
|---|---|---|---|---|
| 7,509,646 B1* | 3/2009 | Maw | ....................... | G06F 9/505 703/22 |
| 2007/0142925 A1* | 6/2007 | Heinzmann | ....... | G06F 16/24532 700/1 |
| 2008/0115143 A1* | 5/2008 | Shimizu | ................ | G06F 9/5066 718/105 |
| 2008/0235697 A1* | 9/2008 | Kobayashi | ............ | G06F 9/4881 718/103 |
| 2009/0177644 A1* | 7/2009 | Martinez | ................ | G06Q 30/02 |

(Continued)

Primary Examiner — Charles M Swift
(74) Attorney, Agent, or Firm — Schwegman Lundberg & Woessner, P.A.

(57) ABSTRACT

Systems and methods are presented for determining, by a server computer, at a predetermined time, a plurality of jobs to be run, determining, by the server computer, a priority queue for the jobs based on an account type associated with each job of the plurality of jobs, and for each account type, in an order according to the priority queue, calculating a target group for each account type based on the number of tasks for each job associated with the account type, splitting the target group for each account type into a plurality of packages wherein the size of each of the packages is based on the account type and a complexity of rules associated with the account type, determining a number of threads for executing the plurality of packages for each account type based on a number of the plurality of packages, and wherein for each of the plurality of packages, business logic associated with the package is executed by one of the number of threads and notification is provided indicating that execution of the package is complete.

20 Claims, 9 Drawing Sheets

(56) References Cited

U.S. PATENT DOCUMENTS

| | | | | |
|---|---|---|---|---|
| 2010/0269111 | A1* | 10/2010 | Conte | G06Q 10/06 |
| | | | | 718/100 |
| 2010/0275107 | A1* | 10/2010 | Peters | H03M 13/2975 |
| | | | | 714/799 |
| 2011/0161976 | A1* | 6/2011 | Alexander | G06F 9/5066 |
| | | | | 718/104 |
| 2012/0131584 | A1* | 5/2012 | Raevsky | G06F 8/45 |
| | | | | 718/102 |
| 2013/0031560 | A1* | 1/2013 | Gargash | G06F 11/3013 |
| | | | | 718/104 |
| 2013/0091286 | A1* | 4/2013 | Spencer | H04L 47/25 |
| | | | | 709/226 |
| 2013/0339427 | A1* | 12/2013 | Riley | H04L 67/42 |
| | | | | 709/203 |
| 2014/0380320 | A1* | 12/2014 | Lin | G06F 9/4881 |
| | | | | 718/102 |
| 2015/0178135 | A1* | 6/2015 | Wang | G06F 16/285 |
| | | | | 718/104 |
| 2016/0026635 | A1* | 1/2016 | Kunapuli | G06Q 10/0637 |
| | | | | 707/748 |
| 2016/0034482 | A1* | 2/2016 | Liu | G06F 16/182 |
| | | | | 707/736 |
| 2016/0098292 | A1* | 4/2016 | Boutin | G06F 9/505 |
| | | | | 718/104 |

* cited by examiner

FIG. 3A

Time Account Type: RHP_DAILY (RHP_DAILY) — 310

* External Name: RHP_DAILY
Payout Eligibility: No Selection
Interim Account Update Rule: No Selection
Country: No Selection
Unit: Hour(s)
* Account Creation Type: Recurring
Account Creation Offset [Months]: Click or focus to edit
Account Valid From [Day]: 1
Account Valid From [Month]: 1
* Account Creation Automation: Automatic Account Creatio...
  - No Selection
  - No Automation
  - Automatic Account Creation — 301
* Period-End Processing Automation:
Automatic Booking Offset [Months]: 0

Time Account Type: RHP_DAILY (RHP_DAILY)

- * External Name: RHP_DAILY
- Payout Eligibility: No Selection
- Interim Account Update Rule: No Selection
- Country: No Selection
- Unit: Hour(s)
- * Account Creation Type: Recurring
- Account Creation Offset [Months]: Click or focus to edit
- Account Valid From [Day]: 1
- Account Valid From [Month]: 1
- * Account Creation Automation: Automatic Account Creatio...
- * Period-End Processing Automation: Automatic At End Of Booki...
- Account Booking Offset [Months]: 
  - No Automation
  - Automatic At End of Booking Period ← 303

Back to: Admin Center
Manage Time Off Structures

Search: [Q Time Account Type ▽] [Q RHP_DAILY (RHP_DAILY) ▽] Advanced

Time Account Type: RHP_DAILY (RHP_DAILY)

| Field | Value |
|---|---|
| * External Name | RHP_DAILY |
| Payout Eligibility | No Selection |
| Interim Account Update Rule | Q No Selection |
| Country | Q No Selection |
| Unit | Hour(s) |
| * Account Creation Type | Recurring |
| Account Creation Offset [Months] | Click or focus to edit |
| Account Valid From [Day] | 1 |
| Account Valid From [Month] | 1 |
| * Account Creation Automation | Automatic Account Creatio... |
| * Period-End Processing Automation | Automatic At End Of Booki... |
| Account Booking Offset [Months] | 0 |
| Account Creation Start Date | Account Valid From (Day o... |
| Posting Order | Oldest First |
| Period-End Processing Rule | Q No Selection |
| Accrual Frequency Period | Daily |
| * Level Of Accrual Automation | Automatic Accrual Creatio... |
| * Stimulate Accruals | No Automation / Automatic Accrual Creation |

ADAPTIVE JOB SCHEDULING UTILIZING PACKAGING AND THREADS

TECHNICAL FIELD

The present disclosure relates generally to a mechanism for adaptive job scheduling utilizing packaging and threads.

BACKGROUND

There are numerous procedures, rules, laws, and other details that need to be accounted for in any time management system. For example, each company has a different fiscal year or calendar year requirement for time management, different countries have different laws for vacation and sick time, vacation and sick time may accrue differently depending on the company or country, new laws may create new requirements, etc. It is not possible to do all of these tasks manually but human resource administrators still must configure these tasks manually to be run in batch mode on a regular basis. To prepare these tasks manually, however, is incredibly complicated and leads to various issues such as data inconsistency, unpredictable run times, unfair distribution of resources in a data center, inability to track progress of tasks, and an inability to recover efficiently from crashes.

BRIEF SUMMARY

In some implementations, methods and apparatus, including computer program products, are provided for adaptive job scheduling. In one aspect, at a server computer may determine, at a predetermined time, a plurality of jobs to be run and a priority queue for the jobs based on an account type associated with each job of the plurality of jobs. For each account type, in an order according to the priority queue, the server computer may calculate a target group for each account type based on the number of tasks for each job associated with the account type, split the target group for each account type into a plurality of packages wherein the size of each of the packages is based on the account type and a complexity of rules associated with the account type, and determine a number of threads for executing the plurality of packages for each account type based on a number of the plurality of packages. For each of the plurality of packages, business logic associated with the package may be executed by one of the number of threads, and notification may be provided indicating that execution of the package is complete.

The above methods, apparatus, and computer program products may, in some implementations, further include one or more of the following features. Determining a priority queue for the jobs based on account types associated with each job of the plurality of jobs may further comprise determining the account type associated with each of the plurality of jobs to be run, and grouping each job of the plurality of jobs by the account type associated with each of the plurality of jobs. Determining a plurality of jobs to be run may be based on at least one configuration file including input from a user. The complexity of rules may be determined using a score based on the number of points for each type of rule to be run for each account type. A method or instructions may further comprise determining that the score for an account type meets or exceeds a predetermined score, and decreasing the size of each of the packets by a predetermined amount. A method or instructions may further comprise determining that the score for an account type does not meet or exceed a predetermined score, and setting the size of each of the packets according to a predetermined default size. The number of threads may be set to a maximum thread size when the number of the plurality of packages exceeds a predetermined number. The size of each packages may be further determined based on an estimated time it will take to complete the package. The plurality of jobs to be run may be determined for a plurality of entities. The account type may include at least one of a group consisting of: account creation, accruals creation, accrual on actuals creation, interim time account updates, and period end processing.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

Various ones of the appended drawings merely illustrate example embodiments of the present disclosure and should not be considered as limiting its scope.

FIGS. 3A-3C each show an exemplary user interface for configuring various job scheduling functions, according to some example embodiments.

DETAILED DESCRIPTION

Systems and methods described herein relate to adaptive job scheduling. For example, a server system may manage job scheduling and execution for a plurality of time management systems for a plurality of entities. A time management system may be used in a human resources domain to perform human resources processes involving planning, recording, and valuation of internal and external employees' work performed and absence times. A time management system may take into account company agreements, collective agreement stipulations, local and worldwide legal requirements, company timelines and guidelines, etc.

For each of the plurality of entities, the server system may determine a plurality of jobs to be run at a predetermined time (e.g., every night, day, week, month, on a specified date, etc.). The server system may determine a priority queue for the jobs based on an account type associated with each of the plurality of jabs. For each account type, in an order according to the priority queue, the server system may calculate a target group, split the target group into packages, determine a number of threads for the packages, and execute each of the plurality of packages until execution of all of the packages, and jobs, are complete.

As described above there are many issues with conventional time management systems. Example embodiments described herein provide for a number of advantages. For example, exemplary embodiments provide for data consistency by determining what jobs and tasks should be done in what priority order to ensure that data is created and updated in a way to ensure data validity. Moreover, exemplary embodiments provide for packaging and multithreading to ensure predictable run times and fair distribution of resources in a data center. This may be particularly advantageous in a cloud environment where resources are shared amongst a plurality of entities. Exemplary embodiments also provide a way to track progress of jobs or tasks and allow for efficient recovery from crashes. These advantages, individually and collectively, provide for a more efficient and effective system.

Figure 1:
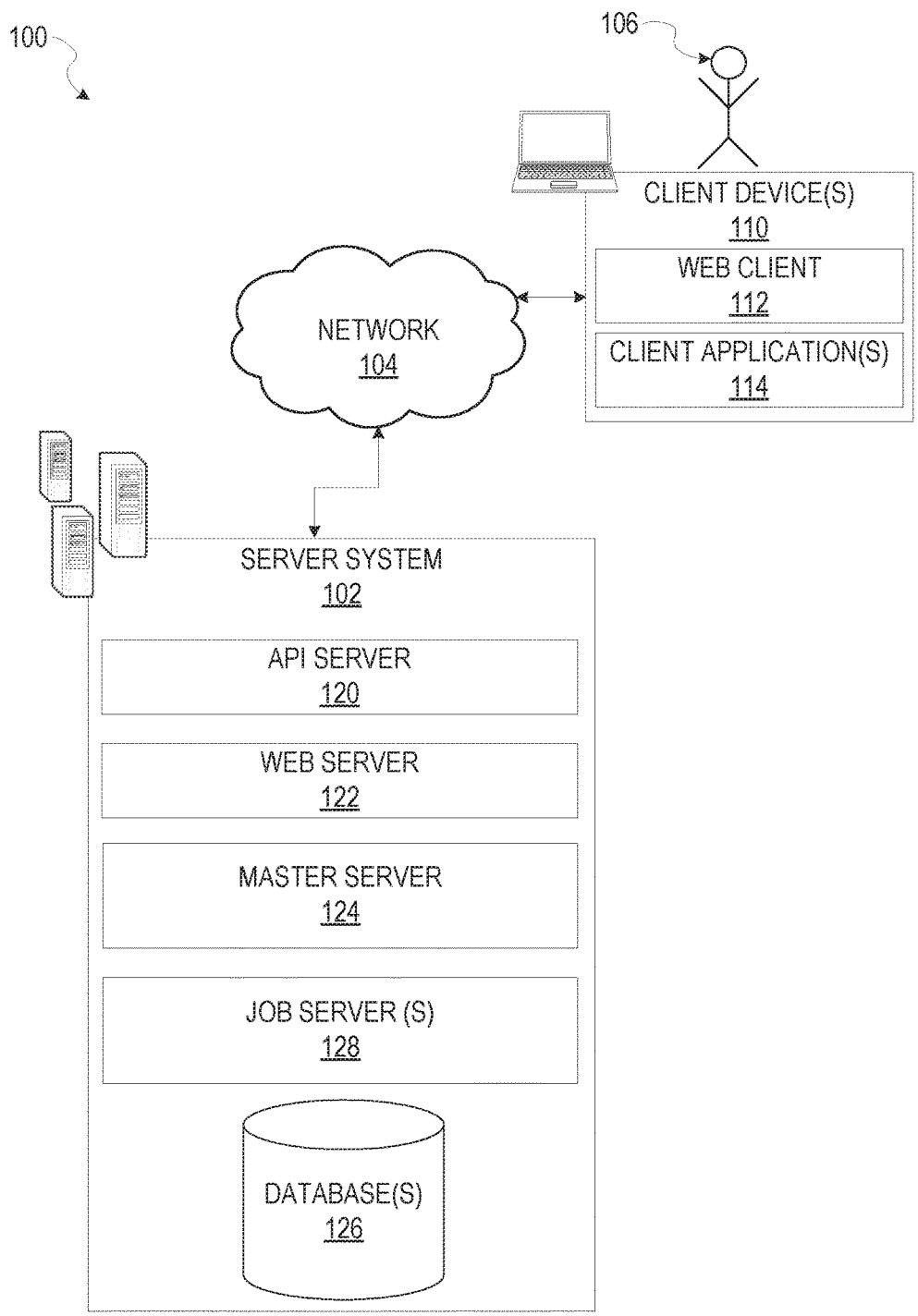
FIG. 1 is a block diagram illustrating networked system for adaptive job scheduling, according to some example embodiments.

FIG. 1 is a block diagram illustrating networked system 100 configured for adaptive job scheduling, according to some example embodiments. The system 100 may include one or more client devices such as client device 110. The client device 110 may comprise, but is not limited to, a mobile phone, desktop computer, laptop, portable digital assistants (PDAs), smart phones, tablets, ultra, books, netbooks, laptops, multi-processor systems, microprocessor-based or programmable consumer electronics, game consoles, set-top boxes, computers in vehicles, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth.

The client device 110 may be a device of a user 106, such as a human resource (HR) administrator, which is used to configure jobs or tasks to be scheduled for execution. In one embodiment, the system 100 is an adaptive job scheduling system that utilizes input from a plurality of users 106 to schedule jobs in a predetermined priority order to ensure data consistency, predictable run times, fair distribution of resources in a data center, ability to track progress of tasks, and an ability to recover efficiently from crashes. The plurality of users may be associated with a plurality of entities such as companies that have a plurality of employees.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touch screen input or alphanumeric input) to the client device 110 and the input may be communicated to other entities in the system 100 (e.g., server system 102) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Washington State) or one or more client applications 114. The client device 110 may include one or more applications 114 (also referred to as "apps") such as, but not limited to, a web browser, messaging application, electronic mail (email) application, an e-commerce site application, a mapping or location application, a time management application, a human resources application, and the like. In some embodiments, one or more applications 114 may be included in a given one of the client device 110, and configured to locally provide the user interface and at least some of the functionalities with the application 114 configured to communicate with other entities in the system 100 (e.g., server system 102), on an as needed basis, for data and/or processing capabilities not locally available (e.g., access a time management system, to authenticate a user 106, to verify a method of payment, etc.). Conversely, one or more applications 114 may not be included in the client device 110, and then the client device 110 may use its web browser to access the one or more applications hosted on other entities in the system 100 (e.g., server system 102).

A server system 102 may provide server-side functionality via the network 104 (e.g., the Internet or wide area network (WAN)) to one or more client devices 110. The server system 102 may be a cloud computing environment according so some exemplary embodiment.

The server system 102 may include an application program interface (API) server 120, a web server 122, a master server 124, and one or more job server(s) 128, that may be communicatively coupled with one or more databases 126. Databases 126 may be storage devices that store information such as time management configuration information, job and task information, priority queue information, etc.

The master server 124 may provide functionality to perform adaptive job scheduling and execution. The master server 124 may access one or more databases 126 to retrieve stored data to use in adaptive job scheduling and execution and to store results of such jobs. The one or more job server(s) 128 may provide functionality to perform execution of a plurality of packages and notification of completion of execution. The one or more job server(s) 128 may access one or more databases 126 to retrieve stored data to use in the execution and notification of the plurality of packages and to store results of the same.

Continuing to refer to FIG. 1, the server system 102 may interact with client device(s) 110 to provide tools or applications for configuring time management jobs or tasks. For example, the server system 102 may provide a user interface for a user 106, such as an HR administrator at an entity, to configure jobs to be run (e.g., to select jobs to be run and any associated parameters for each job). Exemplary user interfaces are shown in FIGS. 3A-3C. As can be seen in FIGS. 3A-3C, there are various parameters that can be configured by the user 106.

In one example user interface 310, shown in FIG. 3A, the user 106 may select automatic account creation 301 to cause a daily job to be run that sets up new accounts (e.g., for new employees, for existing employees for a new calendar or fiscal year, etc.). For instance, a user may select an option via a button, link, drop down menu item, etc. Automatic account creation may be a job that will be scheduled to run daily. In addition or in the alternative, automatic account creation may be scheduled to create accounts a number of days or months in advance.

In another example user interface 320, shown in FIG. 3B, the user 106 may select automatic at end of booking period 303 (e.g., to settle a balance for one or more accounts). For instance, a user may select an option via a button, link, drop down menu item, etc. This processing may be done after the end of the booking period.

In another example user interface 330, shown in FIG. 3C, the user 106 may select level of accrual automation 305 (e.g., long-service leave accrual, vacation accrual, etc.). For instance, a user may select an option via a button, link, drop down menu item, etc. This processing may be done daily or at another time interval.

Once the user 106 has configured a particular job to be run. The configuration file may be stored at the server system 102 in one or more database(s) 126. Since the server system 102 provides adaptive job scheduling for a plurality of entities, the server system 102 may receive and store a plurality of configuration files for each of the plurality of entities. Each entity may have multiple users (e.g., HR administrators) that are creating one or more configuration files.

Figure 2:
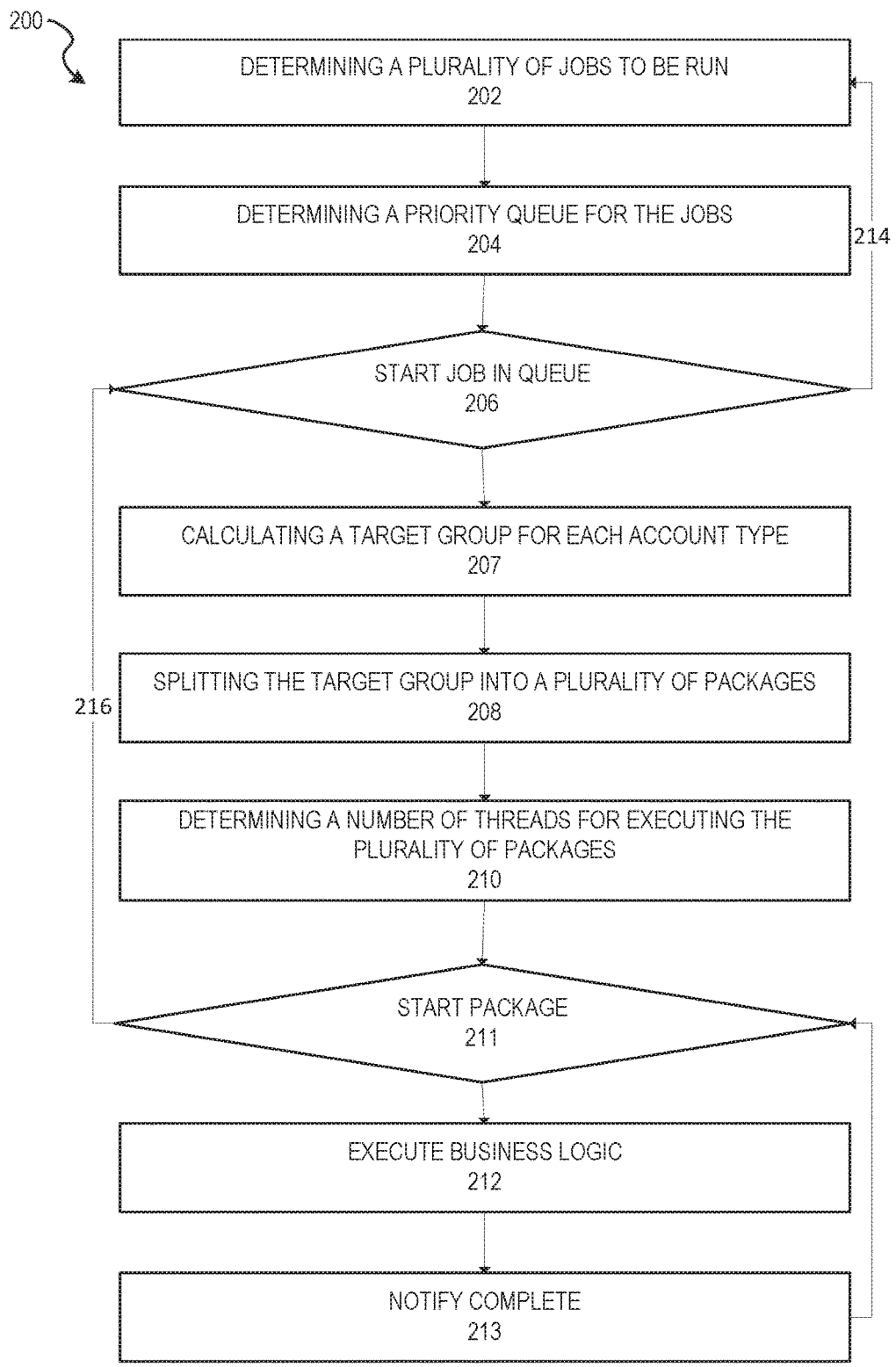
FIG. 2 is a flowchart illustrating aspects of a method for adaptive job scheduling, according to some example embodiments.

FIG. 2 is a flow chart illustrating aspects of a method 200 for adaptive job scheduling, according to some example embodiments. For illustrative purposes, method 200 is described with respect to the networked system 100 of FIG. 1. It is to be understood that method 200 may be practiced with other system configurations in other embodiments.

In operation 202 a server system 102 (e.g., via master server 124) may determine a plurality of jobs to be run. For example, the server system 102 may manage jobs from a plurality of entities (e.g., customers, companies, etc.). And thus, the master server 124 may determine a plurality of jobs to be run for each entity. The master server 124 may be scheduled to check for jobs to be run at a predetermined time (e.g., 12:05 a.m. every day).

For each entity, the master server 124 may analyze any configuration files stored in one or more databases 126 to determine a priority queue for the jobs identified in the configuration files, at operation 204. For example, the master server 124 may determine an account type associated with each of the plurality of jobs to be run. An account type (e.g., a time account type) may be a configuration object that can originate or lead to one or more tasks. An entity may have any number of account types. Some examples of an account type may be account creation, accrual creation, accrual on actuals creation, interim update, period end processing, and accrual transfer. The master server 124 may group each job, of the plurality of jobs, by the account type associated with each of the plurality of jobs. The master server 124 may then determine a priority queue of the jobs by account type, to determine an order for executing the jobs.

Figure 4:
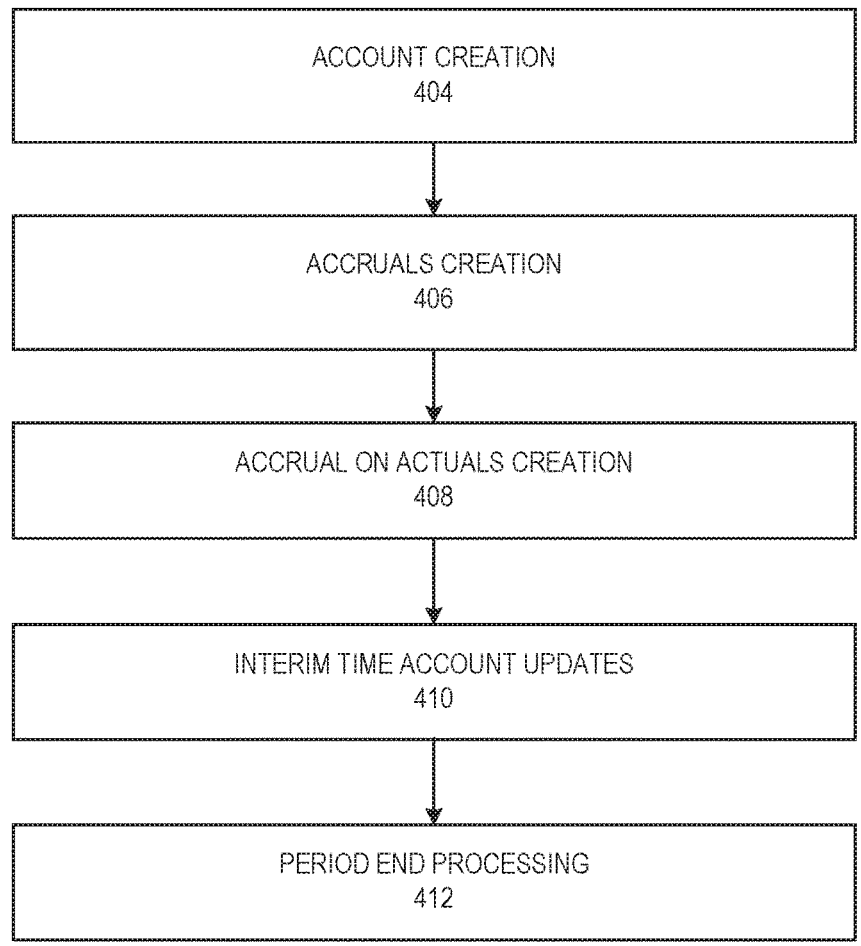
FIG. 4 is a flowchart illustrating an exemplary priority queue, according to some example embodiments.

An exemplary priority queue 400 is shown in FIG. 4. The priority queue may represent a logical order for executing jobs. For example, it may make sense to create accounts first, before doing any accruals or other updates. After account creation 404, the logical order in the exemplary queue in FIG. 4 may be accruals creation 406, accrual on actuals creation 408, interim time account updates 410, and period end processing 412. After the last account type in the queue (e.g., period end processing) the process may be complete for that particular entity. At any given time, a particular entity may have jobs for all of the account types, or for just a subset of the account types. For example, a particular entity may not have any account creations jobs at one time, but have many account creation jobs at another time.

Returning to FIG. 2, in operation 206 the master server 124 may determine and start the next job in the queue. For example, if this is the first job in the queue for a particular entity, the master server 124 would start the first account type (e.g., account creation 404). If there are no more jobs in the queue (e.g., the process has finished the last job in the queue), at operation 214 the master server 124 may return to operation 202 to determine the jobs to be run for the next entity.

For the first job (e.g., account creation 404) the master server 124 may calculate a target group for the account type at operation 207. For example, the master server 124 may calculate the number of tasks for each job associated with the account type. This number of tasks may be the target group for the account type. In one example, a target group for account creation may be the number of accounts that need to be created (e.g., 2,000 accounts).

In operation 208, the master server 124 may split the target group for each account type into a plurality of packages. For example, the system may need to create new accounts for 2,000 employees for a particular entity. The system may pack up the 2,000 accounts into reasonable-sized packages.

The number and size of each package may be based on the account type and a complexity of rules associated with the account type. For example, a default package size for account creation may be 500 tasks, for accrual creation it may be 150 tasks, for accrual creation on actuals it may be 150 tasks, for interim update it may be 300 tasks, and for period end processing it may be 300 tasks. The master server 124 may evaluate rules for each job or account type and determine whether the packages sizes should be decreased based on the complexity of the rules. For example, a scoring system may be used where points are associated with each particular rule. And if a particular job or account type meets or exceeds a predetermined score, the rules may be considered to be complex rules and the package sizes may be decreased.

One exemplary rule may be a look up table access (e.g., to read some configuration object). For instance, looking up a number of annual leave days per organization unit and country. One point may be associated with this rule. Another exemplary rule may be access to job information (e.g., read contractual data of an employee). There may be two points associated with this rule. Another exemplary rule may be a simple rule function such as an arithmetic operation (e.g., divide, multiply, etc.). There may be one point associated with this rule. Another example of a rule may be a complex rule function (e.g., a number of absence days in a period for a time type). This rule may have two points associated with it.

In one example, a predetermined score may be eight points to decrease package sizes to a size associated with a complex rule. For example, if the rules associated with accrual creation meet or exceed eight points, a package size for accrual creation may be decreased to 100 tasks. If the rules associated with accrual creation on actuals meet or exceed eight points, the package size may be decreased to 100 tasks if the rules associated with interim time account updates meet or exceed eight points, the package size may be decreased to 200 tasks. If the rules associated with period end processing meet or exceed eight points, the package size may be decreased to 200 tasks.

The package size may be decreased based on a predetermined amount of tasks (e.g., from a default 150 package size to a complex 100 package size) or may be decreased based on an estimated time it will take to complete the package. For example, the system may determine that a package needs to be executed in a predetermined amount of time and adjust the package size accordingly. Some reasons for this may be to be sure that enough resources are allocated for the job, to be sure that any one job or jobs for a particular entity do not dominate all the resources in the system, and to be sure that jobs are completed in a timely manner. In one example, the system may determine that the creation of an account may take one millisecond and that the system does not want a transaction time for a package to exceed two seconds. Accordingly, for a target group of 2,000, the system may set the package size to a maximum of 200 tasks (e.g., time accounts) per package to meet this time goal. In this example this would result in 10 packages for the account creation type job.

In another example, the system may determine that accrual generation takes much longer than account creation, and thus may need smaller packages. For example, if 2,000 accruals need to be generated and the package size is 50, the result would be 40 packages. In this way the system can dynamically change the size of the packages based on various goals and requirements.

In operation 210, the master server 124 may determine a number of threads for executing the plurality of packages. For example, the master server 124 may determine a number of threads based on the number of the plurality of packages. In one example, the number of threads may be based on a predetermined number of packages. For instance, if there are over 1,000 packages, the packages may be executed using four or six threads. The number of threads may also be based on an estimated time it will take to complete the job. For example, the system may have a goal of completing a job in approximately 15 minutes. Accordingly, the master server may determine how many threads are necessary to complete all the packages for the job in approximately 15 minutes.

In one example there may be a maximum number of threads that may be used, regardless of number of packages. For example, there may be a maximum of four or six threads used. This may avoid a "bad neighbor scenario" where one entity with a huge number of tasks (e.g., account creation for 200,000 employees) that would lead to a large amount of threads and may effectively shut down a data center.

In operation 211, the master server 124 determines if there is a next (or first) package to be executed and starts execution of the package. For example, the master server 124 sends the package to one or more job server(s) 128 to execute the package. This may include executing business logic (operation 212) and then notifying the master server 124 that the package is complete (operation 213). When the master server 124 receives the notification that the package is complete, the master server 124 determines if there is a next package to be executed and the process is repeated until the master server 124 determines that the last package has been executed. At operation 216 the master server 124 returns to operation 206 to determine if there is a next job in the queue. The process is repeated until the master server 124 determines that there are no more jobs in the queue. At operation 214 the master server 124 determines a plurality of jobs to be run for the next entity. The process is repeated until there are no more entities. After that the process ends.

If there is more than one thread for executing the plurality of packages, a job manager in the server system 102 (e.g., in the master server 124 or in the job server 128) determines the number of threads and manages allocating packages to each thread. For example, the job manager may determine that there are four threads and may allocate a first package to a first thread, a second package to a second thread, a third package to a third thread, and a fourth package to a fourth thread. When each thread completes the execution of the package, it notifies the job manager and the job manager allocates the next package to that thread. This process repeats until all the packages are executed for the job as explained above.

Figure 5:
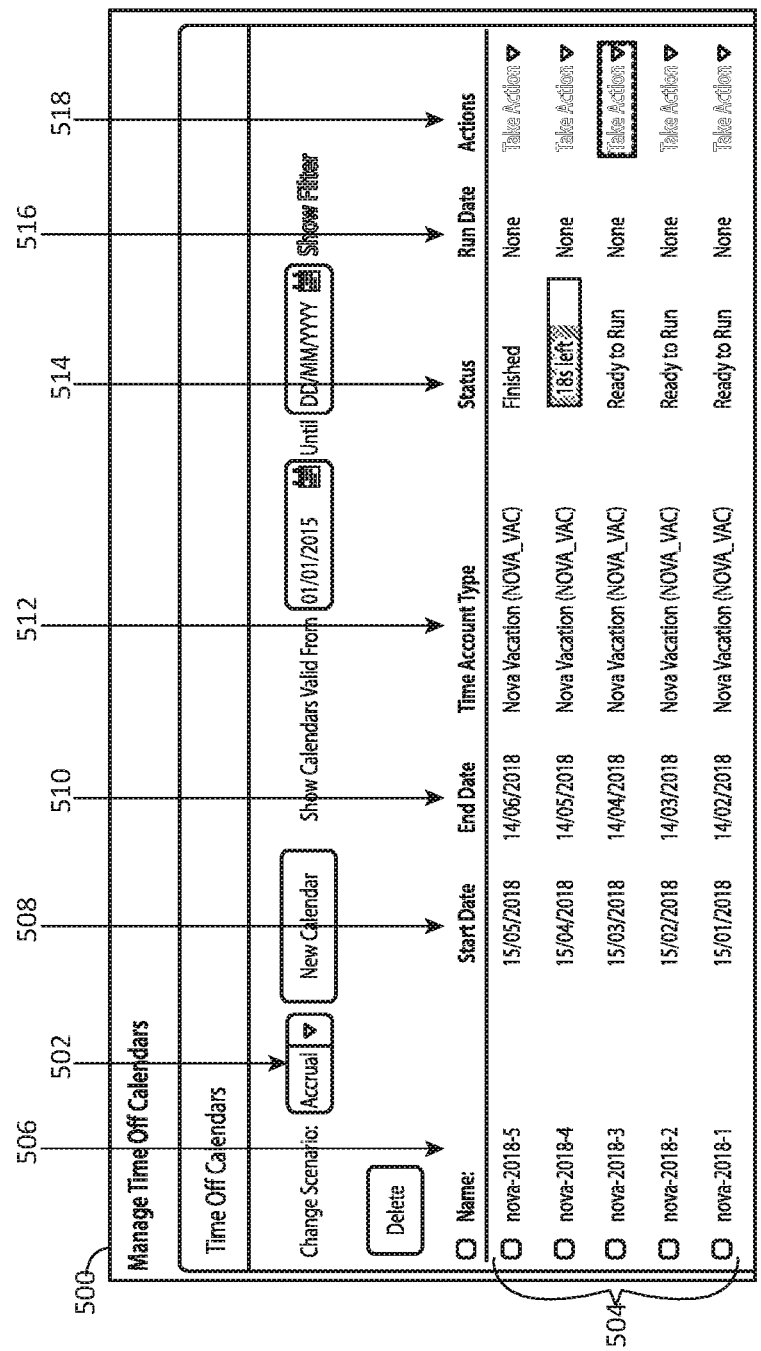
FIG. 5 is an exemplary user interface for accessing job statuses, according to some example embodiments.

The system may provide entities a tool or interface for monitoring progress of jobs or tasks. For example, the server system 102 may provide a user interface 500 as shown in FIG. 5. The user interface may allow a user 106 in an entity view the status of a particular account type 502 (e.g., accrual). For example, the user 106 may see a list of jobs 504 that have been created. For each job the user 106 may view a name 506 for the job, a start date 508, an end date 510, a time account type 512, a status 514 (e.g., ready to run, finished, in progress, percent complete, etc.), a run date 516, and a variety of actions 518 that the user may select.

Figure 6:
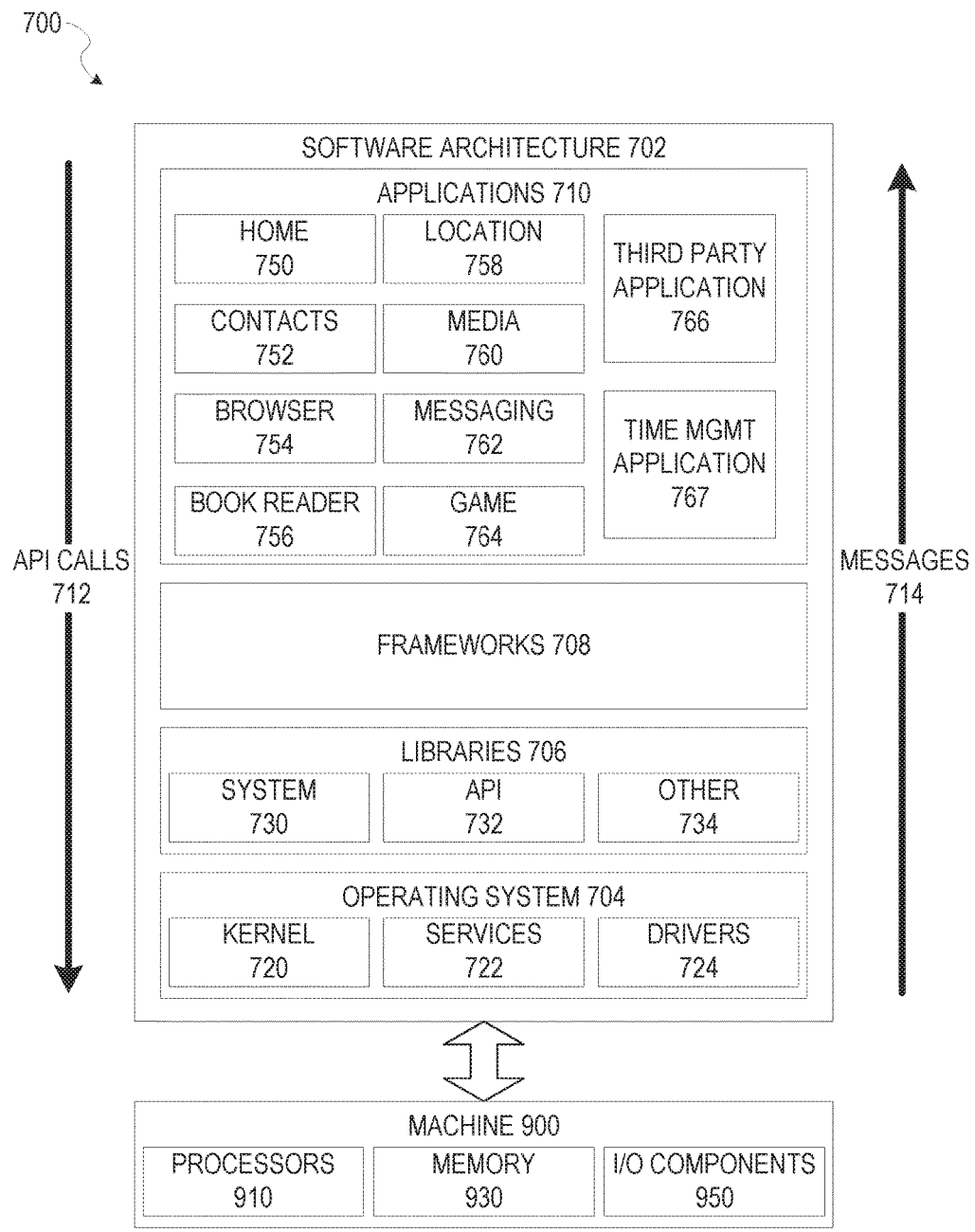
FIG. 6 is a block diagram illustrating an example of a software architecture that may be installed on a machine, according to some example embodiments, configured for adaptive job scheduling.

FIG. 6 is a block diagram 700 illustrating an architecture of software 702, which can be installed on any one or more of the devices described above. For example, in various embodiments, client devices 110 and server system 102, and servers 120, 122, 124, and 128, may be implemented using some or all of the elements of software architecture 702. FIG. 6 is merely a non-limiting example of a software architecture, and it will be appreciated that many other architectures can be implemented to facilitate the functionality described herein. In various embodiments, the software architecture 702 is implemented by hardware such as machine 900 of FIG. 7 that includes processors 910, memory 930, and I/O components 950. In this example, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (MG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications such as a third party applications 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 766 can invoke the API calls 712 provided by the operating system 704 to facilitate functionality described herein.

Some embodiments may include a time management application 767. In certain embodiments, this may be a stand-alone application that operates to manage communications with a server system such as server system 102. In other embodiments, this functionality may be integrated with another application such as a human resources application or another such application. Time management application 767 may request and display various options for configuring jobs for execution and may provide the capability for a user to input data related to job creation via a touch interface, keyboard, or using a camera device of machine 900, communication with a server system via I/O components 950, and receipt and storage of job configuration data in memory 930. Presentation of job configuration information and user inputs associated with time management job creation information may be managed by time management application 767 using different frameworks 708, library 706 elements, or operating system 704 elements operating on a machine 900.

Figure 7:
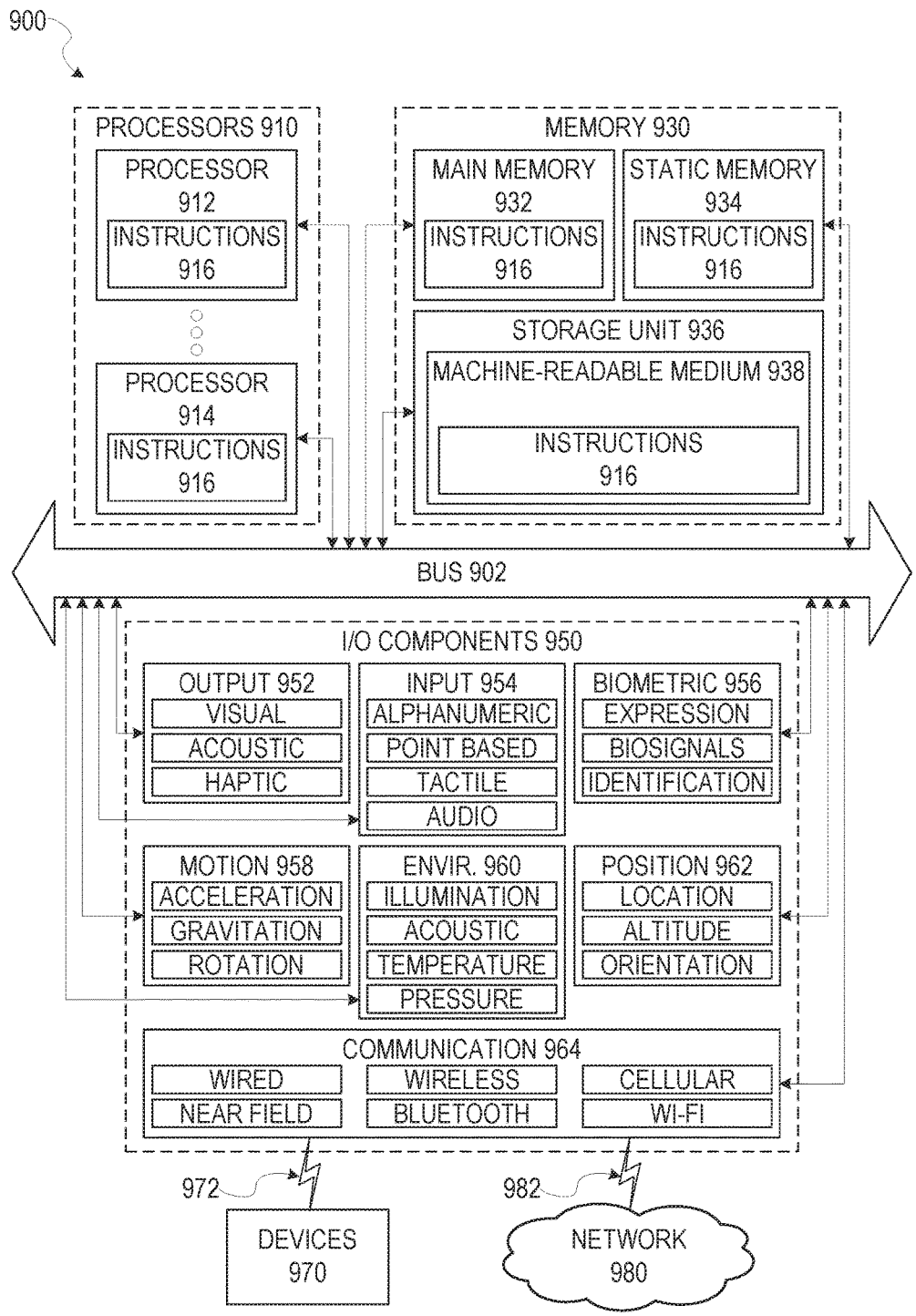
FIG. 7 is a diagrammatic representation of a machine, in the form of a computer system, within which a set of instructions may be executed for causing the machine to perform any one or more of the methodologies discussed herein, according to an example embodiment.

FIG. 7 is a block diagram illustrating components of a machine 900, according to some embodiments, able to read instructions from a machine-readable medium (e.g., a machine-readable storage medium) and perform any one or more of the methodologies discussed herein. Specifically, FIG. 7 shows a diagrammatic representation of the machine 900 in the example form of a computer system, within which instructions 916 (e.g., software, a program, an application 710, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server machine 102, 120, 122, 124, 128, etc., or a. client device 110 in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

In various embodiments, the machine 900 comprises processors 910, memory 930, and I/O components 950, which can be configured to communicate with each other via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 912 and a processor 914 that may execute the instructions 916. The term "processor" is intended to include multi-core processors 910 that may comprise two or more independent processors 912, 914 (also referred to as "cores") that can execute instructions 916 contemporaneously. Although FIG. 7 shows multiple processors 910, the machine 900 may include a single processor 910 with a single core, a single processor 910 with multiple cores (e.g., a multi-core processor 910), multiple processors 912, 914 with a single core, multiple processors 910, 912 with multiples cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any one or more of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown, in an example embodiment, to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions 916, when executed by one or more processors of the machine 900 (e.g., processors 910), cause the machine 900 to perform any one or more of the methodologies described herein. Accordingly, a "machine-readable medium" refers to a single storage apparatus r device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 9. The I/O components 950 are grouped according to functionality merely for simplifying the following discussion, and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962, among a wide array of other components. For example, the biometric components 956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, communication components 964 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 970 may be another machine 900 or any of a wide variety of peripheral devices (e.g., a peripheral device coupled via a Universal Serial Bus (USB)).

Moreover, in some embodiments, the communication components 964 detect identifiers or include components operable to detect identifiers. For example, the communication components 964 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 964, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1×RTT), Evolution-Data Optimized (EVDO) technology General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 "non-transitory" should not be construed to mean that the medium is incapable of movement; the medium 938 should be considered as being transportable from one physical location to another. Additionally, since the machine-readable medium 938 is tangible, the medium 938 may be considered to be a machine-readable device.

Throughout this specification plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:

determining, by a server computer, at a predetermined time, a plurality of jobs for execution;

determining, by the server computer, an account type for each job of the plurality of jobs;

grouping, by the server computer, the plurality of jobs by the account type corresponding to each job of the plurality of jobs to generate an account type group for each grouping of the plurality of jobs, wherein at least a first account type group corresponds to an account type that is different than an account type corresponding to at least a second account type group;

determining, by the server computer, a priority queue indicating an order of execution of account type based on an account type corresponding to each job of the plurality of jobs to determine an order to execute the plurality of jobs by account type group; and for each account type group, in an order of account type according to the priority queue, executing the jobs of each account type group by:

calculating a number of tasks for each job in the account type group;

splitting the number of tasks for the account type group into a plurality of packages, each package comprising a package size based on a default size for the account type and a score indicating a complexity of rules associated with the account type;

determining a number of threads for executing the plurality of packages for the account type group based on a number of the plurality of packages; and wherein for each of the plurality of packages, business logic associated with the package is executed by one of the number of threads and notification is provided indicating that execution of the package is complete.

2. The method of claim 1, wherein determining a plurality of jobs for execution is based on at least one configuration file including input from a user.

3. The method of claim 1, wherein the score is based on a number of points for each type of rule to be run for each account type.

4. The method of claim 3, further comprising:
determining that the score for an account type meets or exceeds a predetermined score; and
decreasing the default size of each of the package by a predetermined amount.

5. The method of claim 3, further comprising:
determining that the score for an account type does not meet or exceed a predetermined score; and
setting the size of each of the package to the default size for the account type.

6. The method of claim 1, wherein the number of threads is set to a predefined maximum thread size when the number of the plurality of packages exceeds a predetermined number.

7. The method of claim 1, wherein the size of each package is further based on an estimated time it will take to complete the package.

8. The method of claim 7, wherein the size of each package is decreased based on the estimated time it will take to complete the package.

9. The method of claim 1, wherein the plurality of jobs for execution are determined for a plurality of entities.

10. The method of claim 1, wherein the account type includes at least one of a group consisting of: account creation, accruals creation, accrual on actuals creation, interim time account updates, and period end processing.

11. A server computer comprising:
one or more processors; and
a computer readable medium coupled with the one or more processors, the computer readable medium comprising instructions stored thereon that are executable by the one or more processors to cause a computing device to perform operations comprising:
determining, at a predetermined time, a plurality of jobs for execution;
determining an account type for each job of the plurality of jobs:
grouping, by the server computer, the plurality of jobs by the account type corresponding to each job of the plurality of jobs to generate an account type group for each grouping of the plurality of jobs, wherein at least a first account type group corresponds to an account type that is different than an account type corresponding to at least a second account type group;
determining a priority queue indicating an order of execution of account type based on an account type corresponding to each job of the plurality of jobs to determine an order to execute the plurality of jobs by account type group; and
for each account type group, in an order of account type according to the priority queue, executing the jobs of each account type group by:
calculating a number of tasks for each job in the account type group;
splitting the number of tasks for the account type group into a plurality of packages, each package comprising a package size based on a default size for the account type and a score indicating a complexity of rules associated with the account type;
determining a number of threads for executing the plurality of packages for the account type group based on a number of the plurality of packages; and
wherein for each of the plurality of packages, business logic associated with the package is executed by one of the number of threads and notification is provided indicating that execution of the package is complete.

12. The server computer of claim 11, wherein determining a plurality of jobs for execution is based on at least one configuration file including input from a user.

13. The server computer of claim 11, wherein the score is based on a number of points for each type of rule to be run for each account type.

14. The server computer of claim 13, wherein the operations further comprise:
determining that the score for an account type meets or exceeds a predetermined score; and
decreasing the default size of each of the package by a predetermined amount.

15. The server computer of claim 13, wherein the operations further comprise:
determining that the score for an account type does not meet or exceed a predetermined score; and
setting the size of each of the package to the default size for the account type.

16. The server computer of claim 11, wherein the number of threads is set to a predefined maximum thread size when the number of the plurality of packages exceeds a predetermined number.

17. The server computer of claim 11, wherein the size of each package is further based on an estimated time it will take to complete the package.

18. The server computer of claim 17, wherein the size of each package is decreased based on the estimated time it will take to complete the package.

19. The server computer of claim 11, wherein the plurality of jobs for execution are determined for a plurality of entities.

20. A non-transitory computer readable medium comprising instructions stored thereon that are executable by one or more processors to cause a computing device to perform operations comprising:
determining, at a predetermined time, a plurality of jobs for execution;
determining an account type for each job of the plurality of jobs;
grouping, by the server computer, the plurality of jobs by the account type corresponding to each job of the plurality of jobs to generate an account type group for each grouping of the plurality of jobs, wherein at least a first account type group corresponds to an account type that is different than an account type corresponding to at least a second account type group;
determining a priority queue indicating an order of execution of account type based on an account type corresponding to each job of the plurality of jobs to determine an order to execute the plurality of jobs by account type group; and
for each account type group, in an order of account type according to the priority queue, executing the jobs of each account type group by:
calculating a number of tasks for each job in the account type group;
splitting the number of tasks for the account type group into a plurality of packages, each package comprising a package size based on a default size for the account type and a score indicating a complexity of rules associated with the account type;

determining a number of threads for executing the plurality of packages for the account type group based on a number of the plurality of packages; and wherein for each of the plurality of packages, business logic associated with the package is executed by one of the number of threads and notification is provided indicating that execution of the package is complete.

* * * * *